United States Patent
Cornelison et al.

[11] Patent Number: 6,132,094
[45] Date of Patent: Oct. 17, 2000

[54] MULTIPLE GROOVE THRUST BEARING

[75] Inventors: Ronald Dean Cornelison, Dublin; Daryle Don Weaver; Rondall Bailey McKelroy, both of Stephenville, all of Tex.

[73] Assignee: FMC Corporation, Chicago, Ill.

[21] Appl. No.: 09/217,864

[22] Filed: Dec. 21, 1998

[51] Int. Cl.[7] .................................................. F16C 17/04
[52] U.S. Cl. ........................ 384/121; 384/123; 384/368; 384/305
[58] Field of Search .................................. 384/121, 123, 384/124, 107, 112, 113, 291, 420, 368–371, 305

[56] References Cited

U.S. PATENT DOCUMENTS

| | | | |
|---|---|---|---|
| 2,362,667 | 11/1944 | Schmidt | 384/305 |
| 3,376,083 | 4/1968 | Muijderman . | |
| 4,380,355 | 4/1983 | Beardmore | 384/123 |
| 5,277,499 | 1/1994 | Kameyama | 384/123 |
| 5,385,409 | 1/1995 | Ide | 384/124 |
| 5,538,347 | 7/1996 | Itoh et al. | 384/107 |
| 5,599,108 | 2/1997 | Ochiai et al. | 384/123 |
| 5,829,338 | 11/1998 | Chrestoff et al. | 92/12.2 |

FOREIGN PATENT DOCUMENTS

| | | |
|---|---|---|
| 623 745 | 11/1994 | European Pat. Off. . |
| 26 36 438 | 5/1977 | Germany . |
| 2 066 377 | 7/1981 | United Kingdom . |

*Primary Examiner*—Thomas R. Hannon
*Attorney, Agent, or Firm*—Pauley Petersen Kinne & Fejer

[57] ABSTRACT

A thrust bearing having a radial taper in its top (land) surface provides improved load distribution when used in high-pressure positive displacement swashplate piston pumps. The thrust bearing includes a plurality of grooves in its land surface which carry and distribute fluid on the top surface during operation of the pump. The fluid is distributed so as to form a hydrodynamic fluid buffer between the thrust bearing and an adjacent pump cam surface, so that the thickness of the fluid buffer is larger in radial regions corresponding to regions of increased load and stress.

28 Claims, 4 Drawing Sheets

MULTIPLE GROOVE THRUST BEARING

FIELD OF THE INVENTION

This invention relates to an improved thrust bearing for use in high-pressure positive-displacement piston pumps. The invention also includes pumps embodying the improved thrust bearing.

BACKGROUND OF THE INVENTION

A unidirectional tapered land thrust bearing cluster is disclosed in U.S. Pat. No. 5,829,338, issued to Chrestoff et al. FIG. 1 is a perspective view of the prior art thrust bearing. The single-piece thrust bearing 10 incorporates a plurality of bearing pads 12 evenly spaced around the circular thrust bearing 10.

Each of the bearing pads 12 in the thrust bearing 10 comprises an integral rectangular-shaped tapered section 14 and integral flat non-tapered section 16. Adjacent each bearing pad 12, the surface of the bearing cluster 10 is machined or otherwise profiled to provide the bearing pad 12 with an integral convergent lubricant path or slot 24. Each tapered section 14 has a tapered rise portion 18 that is the same at the outside diameter 20 as it is at the inside diameter 22 of the bearing 10. Each fluid feed slot 24 will facilitate the development of a hydrodynamic pressure zone along the length of the tapered rise portion 18.

As explained by Chrestoff et al., the thrust bearing 10 is designed for positioning under the back of a pump's swashplate, in a recess in the back plate of the pump. Counterclockwise rotation of the swashplate causes fluid to move from feed slots 24 to tapered rise portions 18 on the thrust bearing, thus forming a pressurized load carrying hydrodynamic film between the thrust bearing and swashplate, which opposes pressure exerted on the swashplate by the pump. Some of the fluid advances from the tapered rise portions 18 to narrow spaces between the flat sections 16 of the bearing, and the adjacent swashplate. In essence, a substantially continuous fluid buffer film is formed between the bearing 10 and adjacent swashplate, to reduce wear on the bearing caused by pump operation.

One disadvantage of the prior art thrust bearing is that the bearing fluid (which performs both cooling and lubricating functions) has not been ideally distributed in an axial direction during pump operation. Accordingly, the thrust bearings have more wear and damage at surface portions near their outer peripheries, than at surface portions near their inner peripheries. There is a need or desire for a thrust bearing which provides better distribution of fluid during pump operation, resulting in more even forces being applied across the bearing.

SUMMARY OF THE INVENTION

The present invention is directed to an improved thrust bearing which facilitates a better distribution of bearing fluid, resulting in more uniform wear of the bearing. The present invention is also directed to pumps which utilize the improved thrust bearing. The thrust bearing of the invention includes a plurality of deflection grooves which carry fluid at an angle relative to the bearing radius, a circular groove intersecting the deflection grooves which supplies water to the face of the thrust bearing and helps distribute the fluid around the bearing, and a radial taper approaching the outer periphery which facilitates formation of a relatively greater fluid buffer near the outer periphery of the bearing.

DETAILED DESCRIPTION OF THE PRESENTLY PREFERRED EMBODIMENTS

Figure 1:
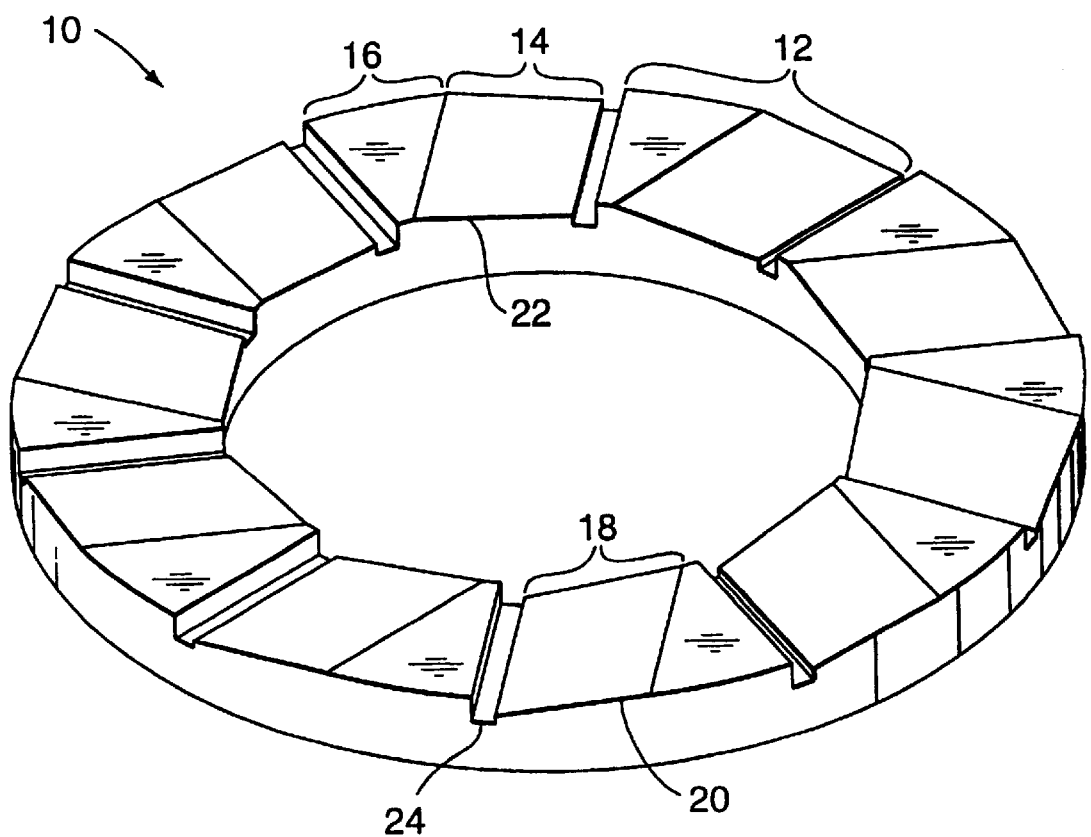
FIG. 1 is a perspective view of the prior art thrust bearing described above.
Figure 2:
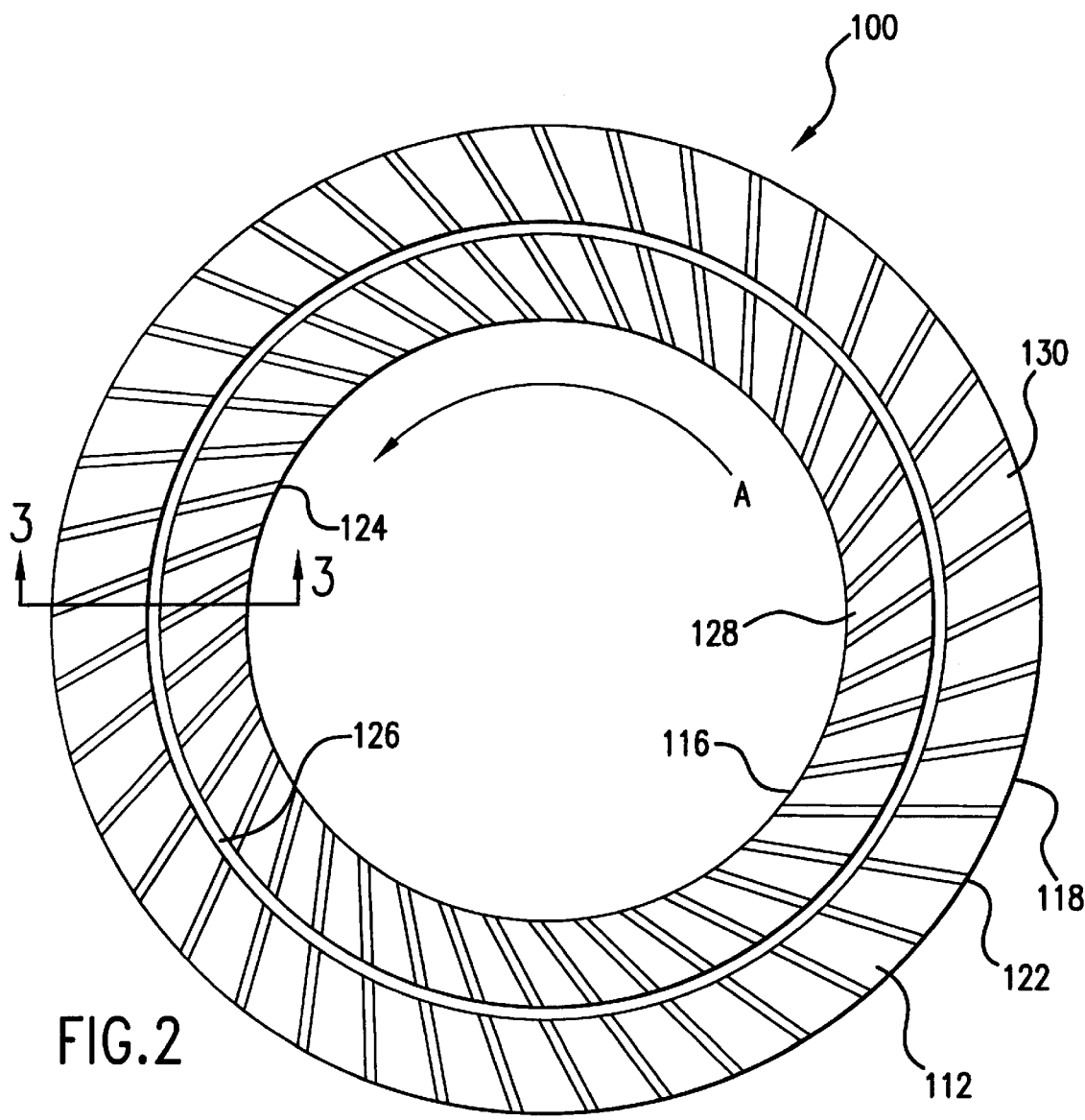
FIG. 2 is a plan view of a thrust bearing of the invention, showing the deflection grooves and intersecting circular groove.
Figure 3:
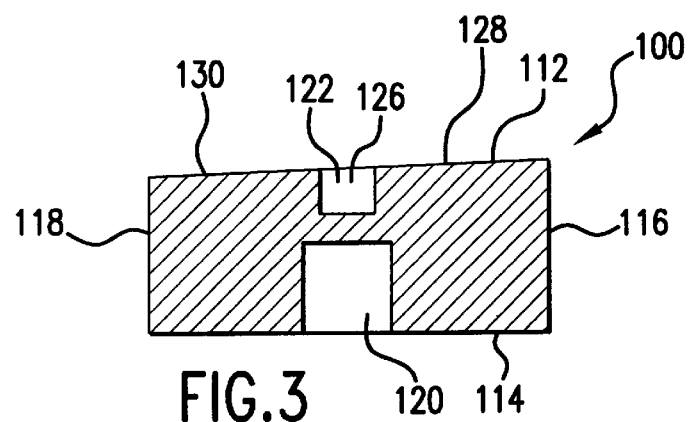
FIG. 3 is a sectional view taken along line 3—3 in FIG. 2, showing the radial taper.

Referring to FIGS. 2 and 3, a thrust bearing 100, preferably having a cylindrical configuration, includes a top surface 112, a bottom surface 114, an inner edge 116 and an outer edge 118. Top surface 112 is adapted for positioning below a pump swashplate (further described below) which, during pump operation, may rotate in a counterclockwise direction as shown by arrow "A". Bottom surface 114 may be positioned in a bearing seat, and may include one or more circular recesses 120 which receive mounting pins to hold the bearing in place.

Top surface 112 includes a plurality of offset grooves 122 which may extend from the inner edge 116 to the outer edge 118. The grooves 122 are offset at an angle relative to the radius of the thrust bearing. The angle of offset between the grooves and the bearing radius may be from about 5 to about 60 degrees, preferably from about 15 to about 50 degrees, more preferably from about 25 to about 40 degrees. The direction of offset depends on the direction of rotation of the cam or swashplate relative to the thrust bearing 100. If the rotation is counterclockwise, then the offset in the grooves (viewed from inner edge 116 to outer edge 118 of bearing 100) should also be counterclockwise, as shown in FIG. 2. If the rotation is clockwise, then the offset should be in the clockwise direction.

The number of grooves 122 should be sufficient to facilitate an adequate distribution of fluid across the top surface 112 of bearing 100. The larger the bearing, the more grooves may be necessary to adequately distribute the fluid. Larger numbers of grooves 122 provide better distribution of bearing fluid. Generally, the grooves 122 are evenly spaced from one another so that adjacent grooves 122 are not more than about 40 degrees apart, preferably not more than about 30 degrees apart, more preferably not more than about 20 degrees apart, most preferably not more than about 10 degrees apart.

An inner groove 126 is positioned in the top surface of the bearing 100, preferably near its center, and intersects the offset grooves 122. Preferably, the inner groove 126 has a circular length, and extends the circular length of the upper surface 112 permitting groove 126 to intersect all of the offset grooves 122. The inner groove 126 works in tandem with the offset in the grooves 122 to adequately distribute bearing fluid across the top surface 112. Fluid from the cam enters offset grooves 122 at points 124, and also enters inner groove 126 which helps distribute the fluid. As explained further below, the rotation of an adjacent cam or swashplate causes some of the fluid to spill over onto the surface 112 between the grooves, with greater amounts of fluid flowing to the outer regions of surface 112 having the greatest taper.

Figure 3A:
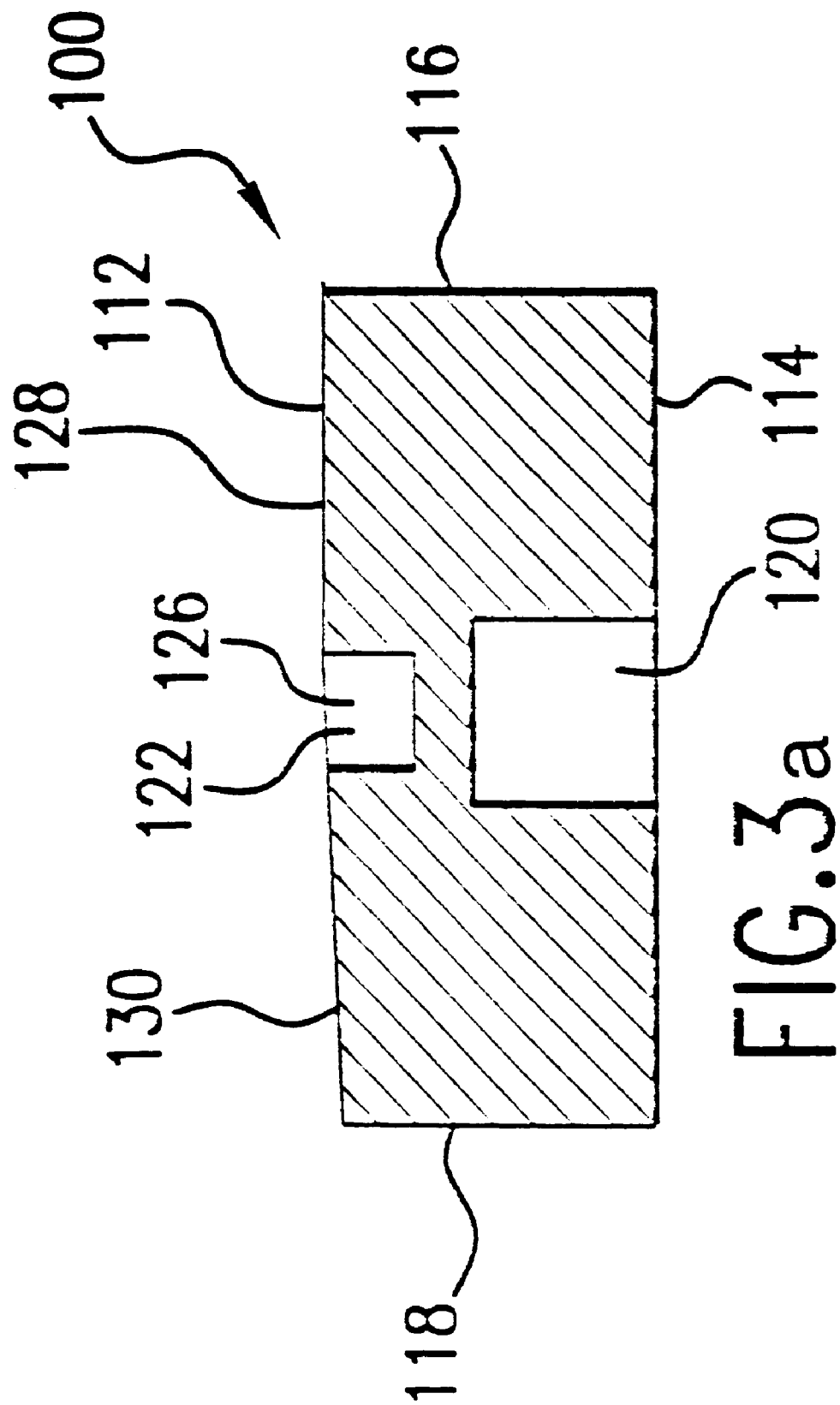
FIG. 3(a) is a sectional view of another embodiment of the thrust bearing, in which the radial taper covers only part of the top surface.

In accordance with the invention, the upper surface 112 of bearing 100 has an outwardly-directed radial taper, such that the outer edge 118 is shorter than the inner edge 116. The radial taper may cover all or part of the surface 112. In the embodiment shown in FIG. 3, upper bearing surface 112 includes an inner, more elevated radially-tapered portion 128 and an outer less elevated radially tapered portion 130 which gradually recedes approaching the outer edge 118. The more elevated tapered portion 128 ends, and the less elevated tapered portion 130 begins, at the inner groove 126. In another embodiment shown in FIG. 3(a), the inner portion 128 may be non-tapered and the outer portion 130 may be tapered. As explained more thoroughly below, the tapering facilitates the formation of a fluid buffer between the upper surface 112 and a pump cam or swashplate, which is of progressively greater thickness and effectiveness approaching the outer edge 118 of bearing 100.

This distribution of fluid is more ideal than in the prior art bearing, because the outer regions of bearing 100 are exposed to progressively more pressure and higher turning velocity from the pump cam or swashplate, than the inner regions of bearing 100. Again, the fluid buffer forms between surface 112 of bearing 100 and a generally flat rotating bottom of a cam or swashplate. Thus, the fluid buffer is greater in regions where there is more space between the two surfaces. By providing a progressively greater fluid buffer above the outer regions, the gradual wear and damage on bearing 100 is more uniformly distributed, resulting in a longer bearing life.

The angle of taper need not be very large. For instance, the angle of taper may be less than 1 degree, and is preferably about 0.1 to 0.5 degrees, more preferably about 0.15 to 0.25 degrees. In the embodiment shown, the radial length of the surface 112 may be about 2.5 inches. The depth of the taper at its lowest portion (above outer edge 18) is preferably about 0.004 to 0.006 inches.

The depths of the offset grooves 122 and inner groove 26 may vary with the bearing size, pump size, number of grooves, and amount of pressure applied by the pump. In the embodiment shown, the bearing has an outer diameter of about 6.5 inches, an inner diameter of about 4 inches, and an edge thickness of about 0.5 inches. The offset grooves 122 (which have semi-circular cross-sections) each have a width of about 0.60 inch, a depth of about 0.30 inch, and an inner radius of about 0.30 inch. There are 40 offset grooves, spaced 9 degrees apart from each other. The inner groove 126 (which has a rectangular cross-section) has a maximum width of about 0.18 inch and a depth of about 0.16 inch. The invention is not limited to these dimensions; other shapes and sizes of the grooves may be more suitable depending on the application.

Figure 4:
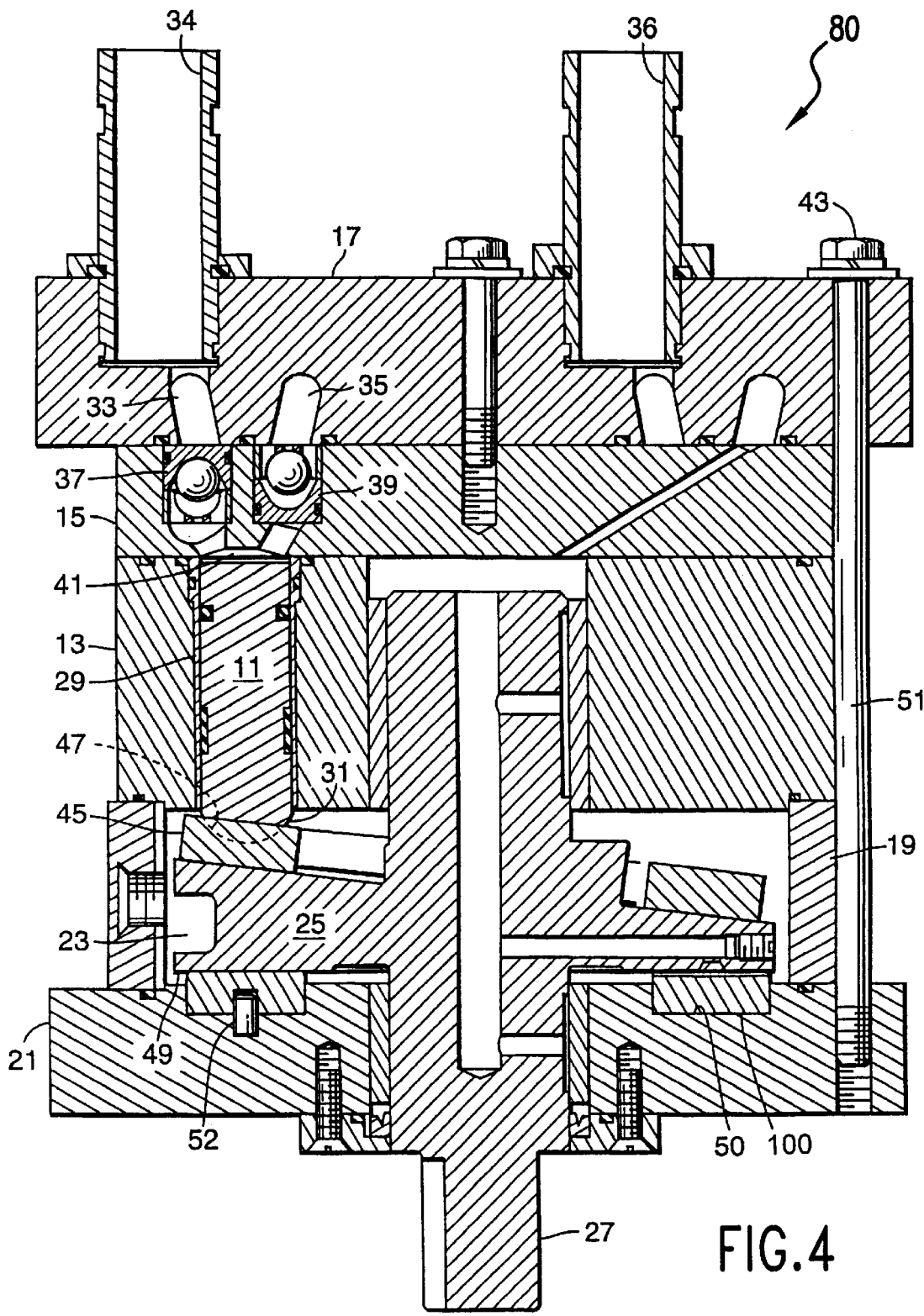
FIG. 4 is a sectional view of a high-pressure positive displacement swashplate piston pump embodying the thrust bearing of the invention.

FIG. 4 is a cross-sectional view of a high-pressure positive-displacement swashplate piston pump 80 configured with the thrust bearing 100 disposed between the back face 49 of swashplate 25 and pump back plate 21. Preferably, bearing 100 is disposed in an annular groove 50 formed in back plate 21. Furthermore, bearing 100 is preferably held in position in groove 50 by a stainless steel pin 52 positioned in opposing holes 120 formed in bearing 100 and back plate 21. Only a single piston 11 is illustrated in the pump 80, although pump 80 generally includes as few as five and as many as twelve pistons. In FIG. 4, a pump body 13 is capped with a check valve housing 15. The check valve housing 15 is capped by a gallery 17. A cam spacer 19 supports the pump body 13 away from pump back plate 21 providing a pressure chamber or cavity 23 for swashplate 25, which is rotatively driven by a driveshaft 27. Hex nuts 43 and bolts 51 securely hold the gallery 17, the check valve housing 15, the pump body 13, cam spacers 19 and back plate 21 together.

When the pump 80 is not in operation, swashplate 25 will rest on each of the bearing surfaces 112 (see FIG. 2) which are integral to the unidirectional tapered land thrust bearing 100.

Operation of the pump 80 and bearing 100 is as follows. Fluid to be pumped will enter the pump 80 through inlet channel 33 and is expelled under pressure out of the pump through outlet channel 35 under pressure created by the upward stroke of pistons 11. Each piston 11 has an inlet channel 33 and an outlet channel 35 associated therewith, and the inlet channels 33 are connected to a pump inlet 34 while the outlet channels are connected to a pump outlet 36. Check valves 37, 39 respectfully control the flow of the pumped fluid into and out of pump 80. A single set of check valves 37, 39 is associated with each piston 11. Each channel 33, 35 communicates with a pressure chamber 41. Each piston 11 is carried in a lined cylinder 29 in the pump body 13. In conventional fashion, the pistons 11 are caused to travel reciprocally in the lined cylinder 29 by the design and camming action of the camming surface of swashplate 25 which is rotatively driven by the driveshaft 27.

Driveshaft 27 is adapted to be rotatively driven by a suitable power source known in the art. Swashplate 25 preferably forms part of and rotates with driveshaft 27. A cluster bearing 45 is operatively positioned between swashplate 25 and each piston 11. The head end 31 of each piston 11 is adapted to abut a corresponding cavity 47 integrally formed in the material comprising cluster bearing 45. As swashplate 25 rotates under the influence of driveshaft 27, the lower surface of cluster bearing 45 rides on the upper thrust bearing surface of swashplate 25, imparting a vertical acceleration component to each piston 11 through corresponding cavity 47. As swashplate 25 rotates in chamber 23, each piston 11 is driven upward to expel pressurized fluid through outlet channel 35.

During operation of the pump, the counterclockwise rotation of the swashplate 25 above the thrust bearing 100 will facilitate the generation of a pressurized load-bearing hydrodynamic film of sufficient thickness between the back surface 49 of the swashplate 25 and the upper surface 112 of bearing 100. Generally, this pressurized load-carrying hydrodynamic film results from the flow of fluid though the grooves 122 and 126 which, to an extent, define fluid channels with the back surface 49 of swashplate 25.

The bearing fluid which may be water or oil, or another suitable lubricating/cooling fluid, enters inlets 124 of offset grooves 122 during rotation of the swashplate 25 (which may be counterclockwise, as shown by arrow A in FIG. 2). Because the fluid entering grooves 122 initially has an axial force vector, some of the fluid flows over the grooves to form a thin hydrodynamic film between the various portions of bearing surface 112 and the swashplate 25. The inner surface portions 128 (having greatest elevation) are each bounded by the inner bearing edge 116, adjacent offset grooves 122, and inner groove 126. Preferably, the offset angle of grooves 122 is selected so that a thin hydrodynamic film substantially covers the inner surface portions 128 during pump operation.

Some of the bearing fluid from the cam is carried to the circular inner groove 26, whereupon the fluid enters the inner groove and becomes distributed substantially uniformly throughout the inner groove. Fluid from the inner groove 126 then flows to the outer less elevated radially tapered surface portions 130, both a) directly, whereupon some fluid flows from the inner groove directly onto the tapered portions 130, and b) indirectly, whereupon some of the fluid flows to outer portions of offset grooves 122 and enters the outer surface portions 130 from those grooves. Preferably, the fluid flow is substantial enough to substantially fill the space between all portions of surface 112 of the bearing 100 and the swashplate 25, thereby forming a hydrodynamic fluid buffer which is a) thinner at locations radially inward from the circular groove 126, and b) becomes progressively thicker at locations radially outward from the circular groove 126, due to the radially tapered surface 112.

This design of bearing 100 creates a hydrodynamic fluid film buffer which is thinner in the inner bearing regions, which are exposed to the least stress, and becomes progressively thicker in the outer bearing regions which are exposed to progressively greater stresses. Uniform wear of the bearing 100 is facilitated, and the bearing use life is prolonged.

While the embodiments of the invention described herein are presently preferred, various modifications and improvements can be made without departing from the spirit and scope of the invention. The scope of the invention is indicated in the appended claims, and all changes that fall within the meaning and range of equivalents are intended to be embraced therein.

We claim:

1. A cylindrical thrust bearing, comprising:

a top surface, a bottom surface, an inner edge and an outer edge;

a plurality of grooves in the top surface extending from the inner edge to the outer edge;

an inner groove in the top surface which intersects the plurality of grooves extending from the inner edge to the outer edge; and a radial taper in the top surface.

2. The thrust bearing of claim 1, wherein the top surface comprises an inner more elevated radially tapered portion and an outer less elevated radially tapered portion.

3. The thrust bearing of claim 1, wherein the top surface comprises an inner non-tapered portion and an outer radially tapered portion.

4. The thrust bearing of claim 1, wherein the grooves extending from the inner edge to the outer edge comprise offset grooves.

5. The thrust bearing of claim 4, wherein the offset grooves are disposed at an offset angle of about 5–60 degrees from a bearing radius.

6. The thrust bearing of claim 5, wherein the offset angle is about 15–50 degrees.

7. The thrust bearing of claim 5, wherein the offset angle is about 25–40 degrees.

8. The thrust bearing of claim 1, wherein the grooves are substantially evenly spaced, not more than about 40 degrees apart.

9. The thrust bearing of claim 8, wherein the grooves are not more than about 30 degrees apart.

10. The thrust bearing of claim 8, wherein the grooves are not more than about 20 degrees apart.

11. The thrust bearing of claim 1, wherein the radial taper has a taper angle of less than about 1 degree relative to a bearing radius.

12. The thrust bearing of claim 11, wherein the taper angle is about 0.1–0.5 degrees.

13. The thrust bearing of claim 11, wherein the taper angle is about 0.15–0.25 degrees.

14. A pump comprising the thrust bearing of claim 1.

15. A thrust bearing, comprising:

a top surface, a bottom surface, an inner edge and an outer edge;

a plurality of offset grooves in the top surface;

an inner groove in the top surface which intersects the plurality of offset grooves; and a taper in the top surface.

16. The thrust bearing of claim 15, wherein the offset grooves are offset at an angle of about 5–60 degrees from a bearing radius.

17. The thrust bearing of claim 16, wherein the offset angle is about 25–40 degrees.

18. The thrust bearing of claim 15, wherein the taper has a taper angle of less than about 1 degree relative to a bearing radius.

19. The thrust bearing of claim 18, wherein the taper angle is about 0.15–0.25 degrees.

20. The thrust bearing of claim 15, wherein the taper is located on both sides of the inner groove.

21. The thrust bearing of claim 15, wherein the taper is located only on one side of the inner grove.

22. A pump comprising the thrust bearing of claim 15.

23. A thrust bearing, comprising:

a top surface, a bottom surface, an inner edge and an outer edge;

a plurality of grooves in the top surface extending outward from the inner edge;

an inner groove in the top surface intersecting the plurality of outward-extending grooves; and a taper in the top surface.

24. The thrust bearing of claim 23, wherein the taper is located on both sides of the inner groove.

25. The thrust bearing of claim 23, wherein the taper is located only on an outward side of the inner groove.

26. The thrust bearing of claim 25, further comprising a non-tapered top surface portion on an inner side of the inner groove.

27. The thrust bearing of claim 23, wherein the outward-extending grooves comprise offset grooves.

28. A pump comprising the thrust bearing of claim 23.

* * * * *